US011978574B2

United States Patent
Turek et al.

(10) Patent No.: US 11,978,574 B2
(45) Date of Patent: May 7, 2024

(54) COMPLIANT JOINT DRIVE ASSEMBLY

(71) Applicant: Goodrich Corporation, Charlotte, NC (US)

(72) Inventors: Łukasz Turek, Wrocław (PL); Piotr Zając, Wrocław (PL)

(73) Assignee: GOODRICH CORPORATION, Charlotte, NC (US)

(*) Notice: Subject to any disclaimer, the term of this patent is extended or adjusted under 35 U.S.C. 154(b) by 43 days.

(21) Appl. No.: 17/826,732

(22) Filed: May 27, 2022

(65) Prior Publication Data

US 2022/0415546 A1 Dec. 29, 2022

(30) Foreign Application Priority Data

Jun. 29, 2021 (EP) ..................................... 21461562

(51) Int. Cl.
*F16K 5/06* (2006.01)
*F16K 31/05* (2006.01)
*H01B 17/56* (2006.01)

(52) U.S. Cl.
CPC ........... *H01B 17/56* (2013.01); *F16K 5/0647* (2013.01); *F16K 31/055* (2013.01)

(58) Field of Classification Search
CPC ...... H01B 17/56; F16K 5/0647; F16K 31/055
See application file for complete search history.

(56) References Cited

U.S. PATENT DOCUMENTS

| | | | |
|---|---|---|---|
| 2,943,464 A | 7/1960 | Voges | |
| 4,034,575 A | 7/1977 | Barth | |
| 8,172,198 B2 | 5/2012 | Dorsey et al. | |
| 2008/0041476 A1 | 2/2008 | Campany et al. | |
| 2013/0341069 A1 | 12/2013 | Demaretz | |
| 2016/0319884 A1 | 11/2016 | Kleinewegen | |
| 2019/0232470 A1 | 8/2019 | Xu | |
| 2020/0376635 A1 | 12/2020 | Raskin et al. | |
| 2022/0260173 A1* | 8/2022 | Turek | F16K 31/041 |
| 2022/0260174 A1* | 8/2022 | Turek | F16K 31/047 |
| 2022/0412409 A1* | 12/2022 | Turek | F16D 3/62 |
| 2022/0415546 A1* | 12/2022 | Turek | F16D 1/101 |
| 2023/0079424 A1* | 3/2023 | Turek | F16D 3/74 |
| 2023/0079935 A1* | 3/2023 | Sapija | F16K 31/041 |

FOREIGN PATENT DOCUMENTS

GB 848151 A 9/1960

OTHER PUBLICATIONS

European Search Report for Application No. 21461562.7, dated Jan. 1, 2022, 7 pages.

* cited by examiner

*Primary Examiner* — Kevin R Barss
(74) *Attorney, Agent, or Firm* — CANTOR COLBURN LLP

(57) ABSTRACT

A torque transfer assembly comprising a drive shaft and a driven shaft and a dielectric insert arranged to be positioned between the drive shaft and the driven shaft, the insert assembly comprising a body of dielectric material shaped to form an insulating layer and configured to engage, respectively, with a first shaped engagement feature on the drive shaft and a second shaped engagement feature on the driven shaft, in torque transfer engagement, the insulating layer providing a dielectric barrier between the drive shaft and the driven shaft.

12 Claims, 9 Drawing Sheets b) Segmented cover with hybrid dielectric barrier a) Single component

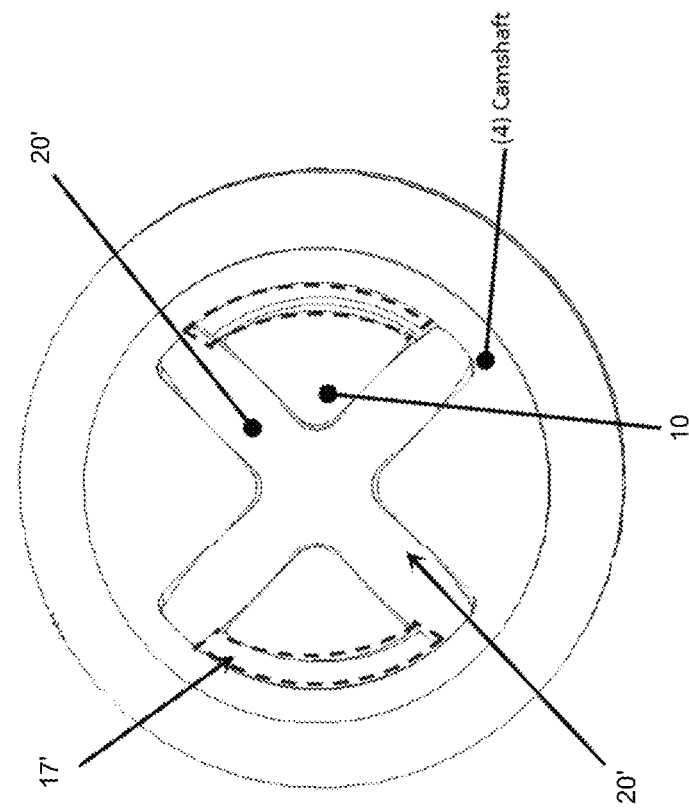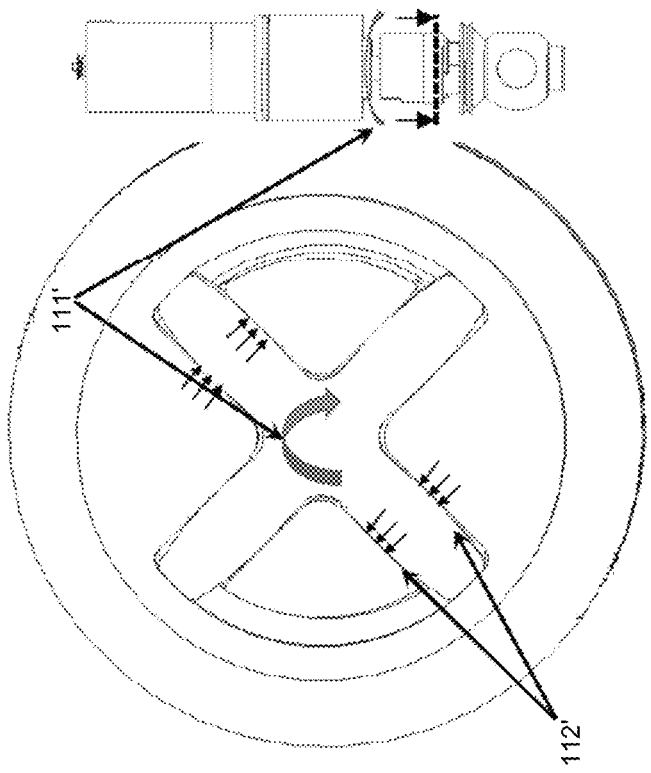
FIG. 10

COMPLIANT JOINT DRIVE ASSEMBLY

CROSS REFERENCE TO RELATED APPLICATIONS

This application claims priority to European Patent Application No. 21461562.7 filed Jun. 29, 2021, the entire contents of which is incorporated herein by reference.

TECHNICAL FIELD

The present disclosure relates to a compliant joint drive assembly whereby torque is transmitted from one end of the assembly to the other, the two ends joined by a compliant joint. An example of such an assembly is a ball valve assembly and, in particular, an assembly for a motorised ball valve.

BACKGROUND

Drive assemblies are used in many applications where a driving force is provided by an actuator such as a manual lever or a motor and the torque from the actuator is transmitted to a movable part along a drive line. For example, a valve may include a valve closure that is rotated by an actuator, either manually by means of a lever or handle or by means of a motor. The drive force from the motor is transmitted to the valve closure along a shaft arrangement, the shaft configured to transfer torque from the actuator to the valve closure. Particularly where the actuator is an electric motor, there is often a need to provide dielectric separation between the electrics and the moveable part especially if the movable part is in e.g. a wet environment, to avoid damage to the 'dry' motor end. On the other hand, it is necessary to maintain torque transmission along the entire drive line.

Ball valves are valves for controlling flow of a fluid e.g. water. The valve includes a ball shaft having a hole therethrough. The ball shaft is rotatable relative to the fluid flow channel such that when the hole is aligned with the channel, the valve allows fluid flow. To stop flow, the ball shaft is rotated so that the hole is not aligned with the flow. Ball valves can be operated manually e.g. by means of a handle for rotating the ball. Actuated ball valves are operated by a motor, which moves the ball shaft between the open and closed positions. Ball valves find use in e.g. sanitation or water systems. One application of a valve moved by an electric motor is in an aircraft water supply system. Aircraft commonly have a water supply system for providing potable water to various outlets e.g. to sinks or wash basins, coffee machines, toilets, etc. One or more valve assemblies is provided in the system for the various outlets and at least some of these are driven by an electric motor so that they can be operated remotely or automatically. Such a system is described e.g. in U.S. Pat. No. 8,172,198. The use of actuated ball valves is, however, not limited to aircraft water systems and there are many other fields of application for such systems.

Actuated ball valves comprise the motor and drive part, also known as the 'dry' part, and the ball shaft part, which comes into contact with the water, also known as the 'wet' part. Seals need to be provided between the wet part and the dry part to avoid damage to the assembly by water getting to the electric motor.

In aircraft systems and in other water systems, the valve ball shaft often has to be made of metal to satisfy durability and safety standards. Problems may occur with the valve if a fault in the electric motor transmits to the ball shaft due to the conductive path between the various metal parts.

The inventors have identified a need for a dielectric barrier to be provided between the two ends of a drive train e.g. between the ball shaft and the electric drive part of a ball valve assembly. The design should be capable of transmitting torque from the actuator end of the drive to the moveable part even in the event that the moveable part experiences some resistance e.g. becomes jammed or frozen such that a short torque peak is experienced.

SUMMARY

According to the disclosure, there is provided a torque transfer assembly comprising a drive shaft and a driven shaft and a dielectric insert arranged to be positioned between the drive shaft and the driven shaft, the insert assembly comprising a body of dielectric material shaped to form an insulating layer and configured to engage, respectively, with a first shaped engagement feature on the drive shaft and a second shaped engagement feature on the driven shaft, in torque transfer engagement, the insulating layer providing a dielectric barrier between the drive shaft and the driven shaft.

The insert may comprise a cross-shaped sleeve of dielectric material, the first shaped engagement feature being a blind bore defining a corresponding cross-shaped receptacle and the second shaped engagement feature comprising a corresponding cross-shaped protrusion.

Other shapes are also possible within the scope of the claims.

The sleeve may be formed as a single piece. Alternatively, the sleeve may be shaped to define a plurality of sleeve sections each configured to fit around a corresponding one of a corresponding plurality of protrusions forming the second engagement feature and to fit into a corresponding one of a corresponding plurality of recesses forming the first engagement feature, the sleeve sections together defining a cross-shape.

The insert and the mating interfaces may be configured such that an air gap is defined between the drive shaft and the driven shaft when the shafts and the insert are assembled together.

The mating surfaces are preferably formed so that the engagement is not between two straight surfaces e.g. to have a convex contact surface.

The insert may be incorporated in a ball shaft assembly comprising a ball shaft as the driven shaft. A motor may be arranged to drive the ball shaft via a cam shaft, as the drive shaft, the insert being located between and in torque transfer engagement with the ball shaft and the cam shaft.

The ball shaft may be part of a water supply system e.g. an aircraft water supply system.

Preferred embodiments will now be described by way of example only, with reference to the drawings.

BRIEF DESCRIPTION OF THE DRAWINGS

FIG. 10 shows the forces acting on the assembly with an insert as shown in FIGS. 8 and 9.

DETAILED DESCRIPTION

Figure 1:
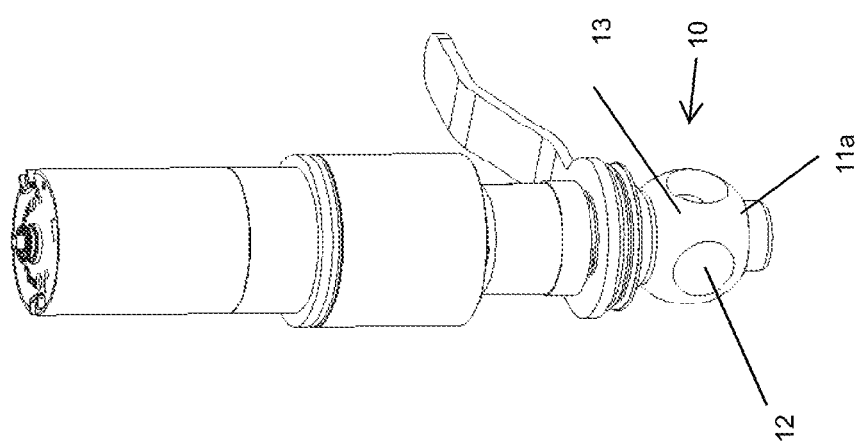
FIG. 1 is a perspective view of a motor driven ball valve assembly that can comprise an insert according to this disclosure.

FIG. 1 is a perspective view of a motorised ball valve assembly including a dielectric insulation component according to the present disclosure.

The operational part of the valve comprises a ball shaft 10 having a head part 11*a* defining a hole 12 therethrough defining a flow passage, and a shaft part 11*b* extending from the head for engagement with a drive part of the assembly. In use, the valve is arranged in a water or fluid pipe system such that in a first rotational position of the ball shaft 10, the hole is aligned with a fluid pipe to form a flow passage from the pipe and through the hole 12. To switch off the flow, the ball shaft is rotated e.g. by one quarter turn, so that the hole is no longer aligned with the pipe and, instead, flow from the pipe is blocked by the body 13 of the ball shaft. Valves with several positions and several input/output ports are known.

Figure 2:
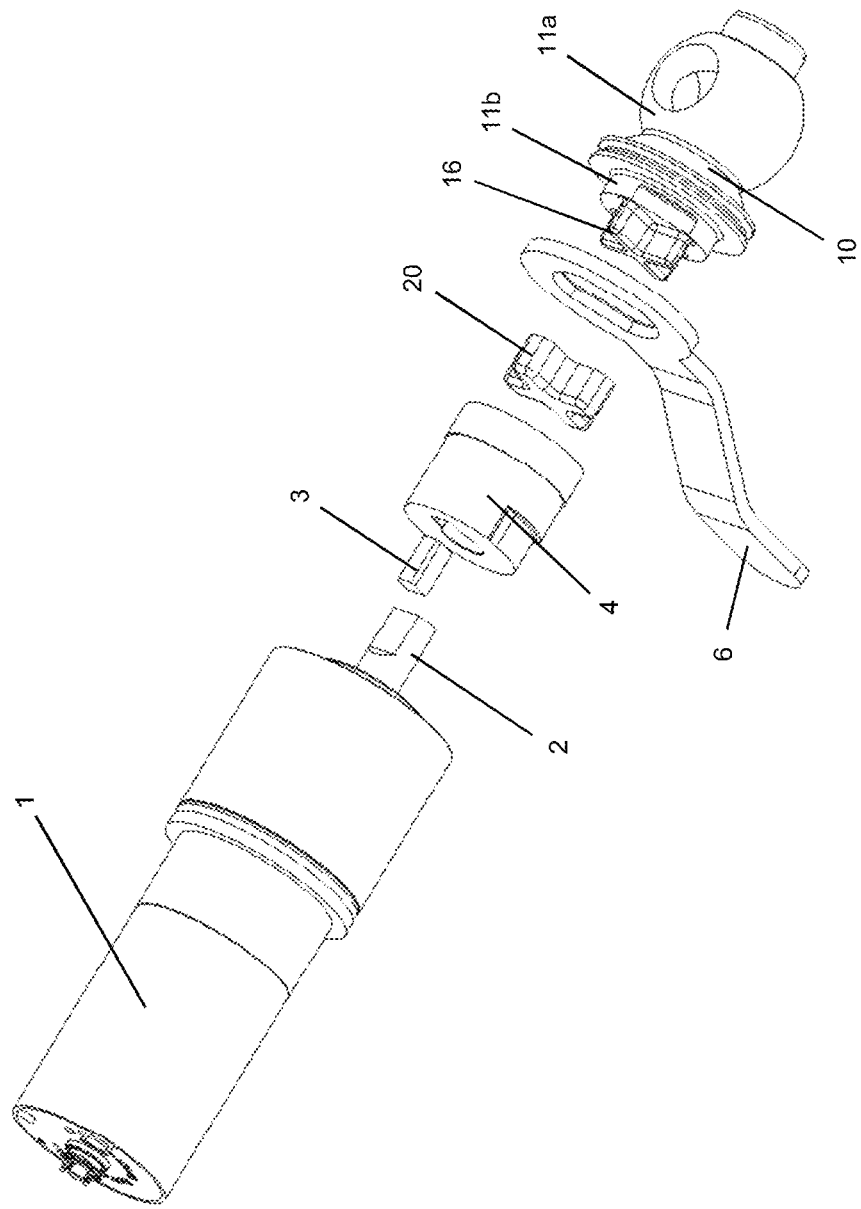
FIG. 2 is an exploded view of the assembly of FIG. 1 according to a first example.

In a motorised ball valve, the ball shaft is rotated by means of an electric motor 1. The electric motor 1 drives a cam shaft 4 which engages with the ball shaft 10. In the example shown (see FIG. 2) the cam shaft 4 is provided with a key feature 3 that engages with a D-shaft 2—i.e. a D-shaped shaft component extending from the motor. Rotation of the motor 1 causes rotation of the D-shaft 2 which, in turn, rotates the cam shaft 4 which rotates the ball shaft 10. Seals e.g. O-rings (not shown) are provided around the ball shaft 10 to prevent water passing into the electric part of the assembly. The cam shaft may be provided with indicators such as microswitches (not shown) which can be mounted in recesses or races on the cam shaft 4, or other forms of sensors or indicators, to provide an indication of the angular position of the shaft. These components are standard for a motorised ball valve such as described in U.S. Pat. No. 8,172,198.

In the event that the motor fails, there is not only the risk of an electrical fault being transmitted to the wet end of the assembly, but there is also the problem that a motor failure will mean that the ball shaft cannot be rotated. In the event of failure of the motor, it may be necessary to change the position of the ball shaft to switch flow on or off. To address this, a manual handle 6 may be provided in close fitting arrangement around the ball shaft so that manual operation of the handle can rotate the ball shaft 10. The handle can be fitted to the ball shaft such that there is a form fitting or frictional engagement between them. Alternatively, a fixing element e.g. a locking pin (not shown) may be provided to secure the handle to the shaft.

As mentioned above, to provide the required strength and to satisfy other standards such as safety, life and hygiene standards, the various shafts and the key feature will often be made of metal e.g. steel. If there is a problem with the electrics at the motor end of the assembly, these would be transmitted directly to the ball shaft and can cause problems such as electric shocks or arcing. To avoid this problem, the assembly of the present disclosure includes a dielectric insulator insert 20 to be fitted between the ball shaft 10 (or, more generally, driven end) and the electric motor 1 (or, more generally, drive end).

The dielectric insulation insert is structured to have dielectric properties and is shaped to provide torque transmission from the electric motor 1 to the ball shaft 10. The shape of the insert should be such as to be able to withstand a short torque peak if the ball shaft end is fixed or blocked. To achieve the torque transfer property, the insert is shaped to define alternating flanges and recesses that engage with corresponding engagement features provided at the ball shaft and the electric motor. The important thing is that the insert has a shape that can engage with the shafts between which it is located in a manner that torque applied to one of the shafts is transferred to the other shaft via the insert.

The insert according to the disclosure may have different forms, as will be described further below, but it is a discrete component made from a body of dielectric material and has a shape arranged to mate with a corresponding shape on the cam shaft and/or the ball shaft or a bushing provided on the ball shaft 10. The mating structure should be such that any misalignment can be accommodated. The insert is a simple, re-usable component easily manufactured from a readily available starting material which can be appropriately shaped and then easily slotted and secured between the cam shaft (or, more generally drive end) and the ball shaft (or, more generally, driven end) to ensure reliable torque transfer between the ends. In an example, particularly for use in wet or harsh environments, all of the components required for torque transfer are made of steel, particularly stainless steel expect for the dielectric insert 20 which functions as a dielectric barrier between the steel parts.

Whilst the insert may have different shapes, as described below, ideally, to ensure reliable torque transmission, the shape should be such as to define multiple points of engagement, as such a structure has been found to transfer the required torque optimally. The camshaft pushes the insert, and the insert pushes the ball shaft. Multiple forces act on distances to the centre of moment. In all examples, the insert and the mating parts of the drive end and the driven end should form a tight fit to reduce the effects of backlash and to ensure coaxiality. The inserts can be e.g. machined to shape from tubing or can be moulded to shape.

In one example, as shown in FIGS. 2 to 7 the insert may be formed as a cross-shaped sleeve 20 of dielectric material that is arranged to be fitted between the cam shaft 4 and the ball shaft 10 to form a dielectric barrier. In this example, the insert 20 is mated with the cam shaft by an interface of the cam shaft 4 having a corresponding cross-shaped blind bore 16 formed therein that matches the outer shape of the insert 20; the ball shaft 10 is provided with an interface that is formed as a protrusion 16 having a corresponding cross shape matching the inner shape of the insert 20. Thus, in use, the insert 20 is fitted over the protrusion 16 at the interface to the ball shaft. The cam shaft 4 is then fitted to the ball shaft such that the blind bore 15 fits over the protrusion 16 sandwiching the sleeve 20, in a tight fit, between the cam shaft and the ball shaft. The cam shaft and ball shaft are therefore tightly fitted together via the insert sleeve 20 such that rotation of the cam shaft causes rotation of the ball shaft by torque being transmitted through the joint with the insert.

Figure 4:
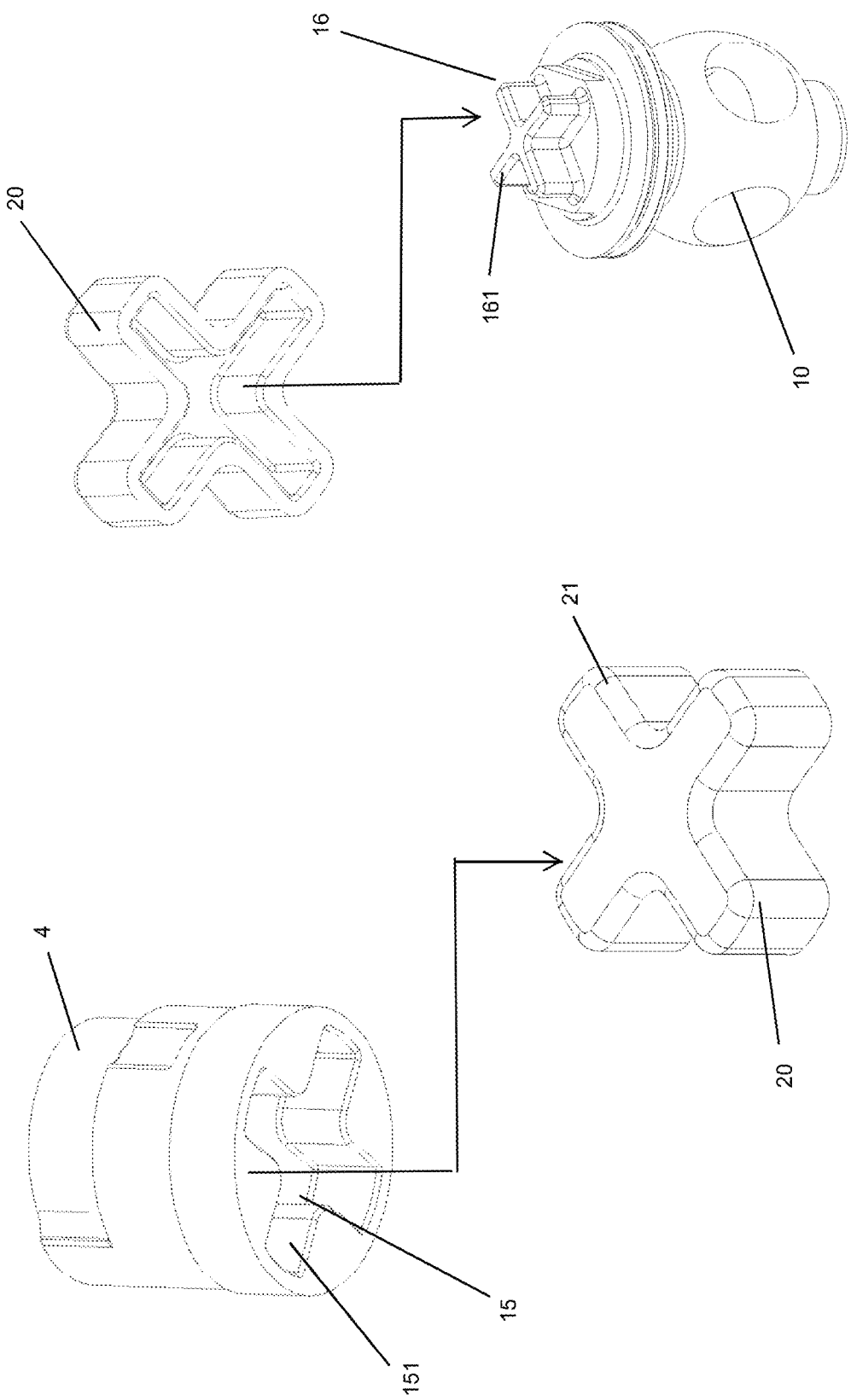
FIG. 4 is a perspective view of one example of a cam shaft, ball shaft and dielectric insulator insert for an assembly in accordance with one example of the disclosure.

In more detail, with reference to FIG. 4, the dielectric insert 20 is in the form of a hollow cross having four arms 21. The blind bore 15 in the cam shaft is a recess defining four portions 151 that match the shape of, and are arranged to closely receive the four arms of the insert 20. The open, hollowed side of the insert fits over corresponding arms 161 of the cross-shaped protrusion 16 on the ball shaft 10, again with a close fit.

Figure 5B:
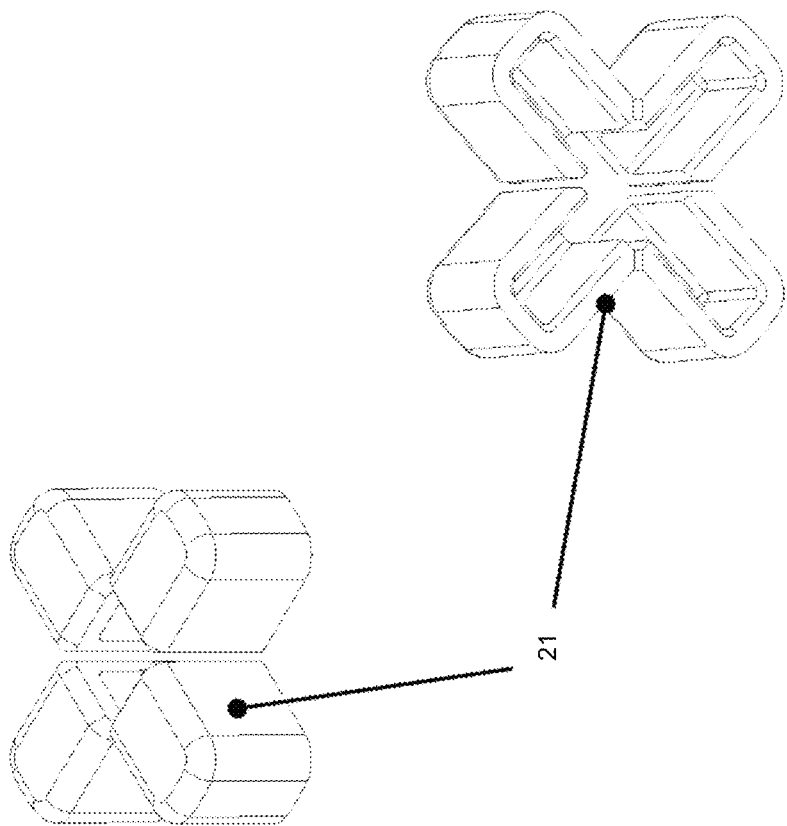
FIGS. 5A and 5B show the insert of FIG. 4 in various examples and from different perspectives.
Figure 5A:
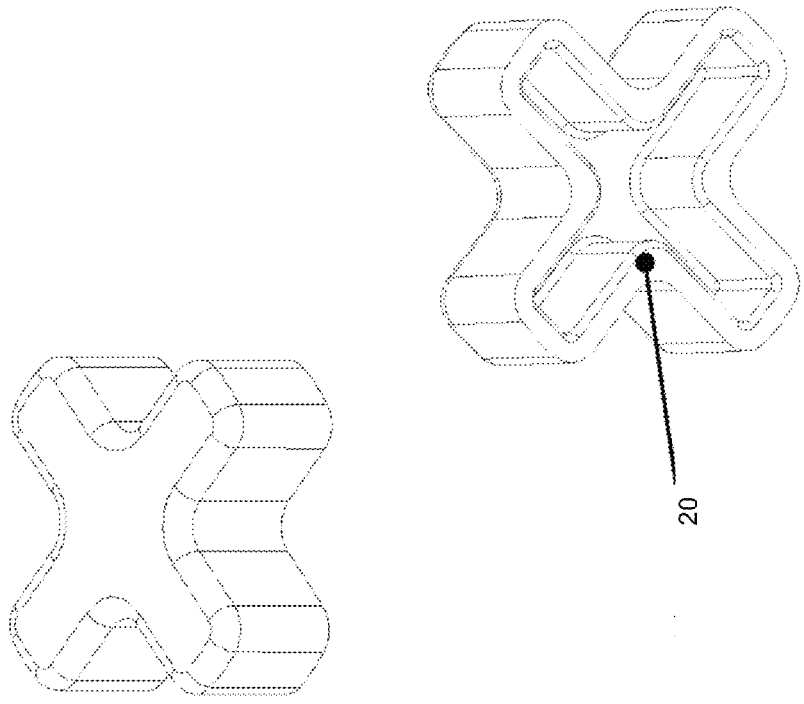

As shown in FIGS. 5A and 5B, the cross-shaped insert can be formed in various ways. The insert can be manufactured as a single piece as shown in FIG. 5A e.g. by moulding or additive manufacture. Alternatively, the insert can be formed from several individual pieces that are then placed with respect to each other to form the cross. As shown in FIG. 5B, each of the arms 21 of the cross could be formed as an individual segment 211 which combined form the cross shape. It may be simpler and more efficient to manufacture a large number of such simple shapes, rather than a ready-made cross-shaped insert. Further, using individual segments allows larger dimensional tolerances to be accommodated.

Figures 6, 7:
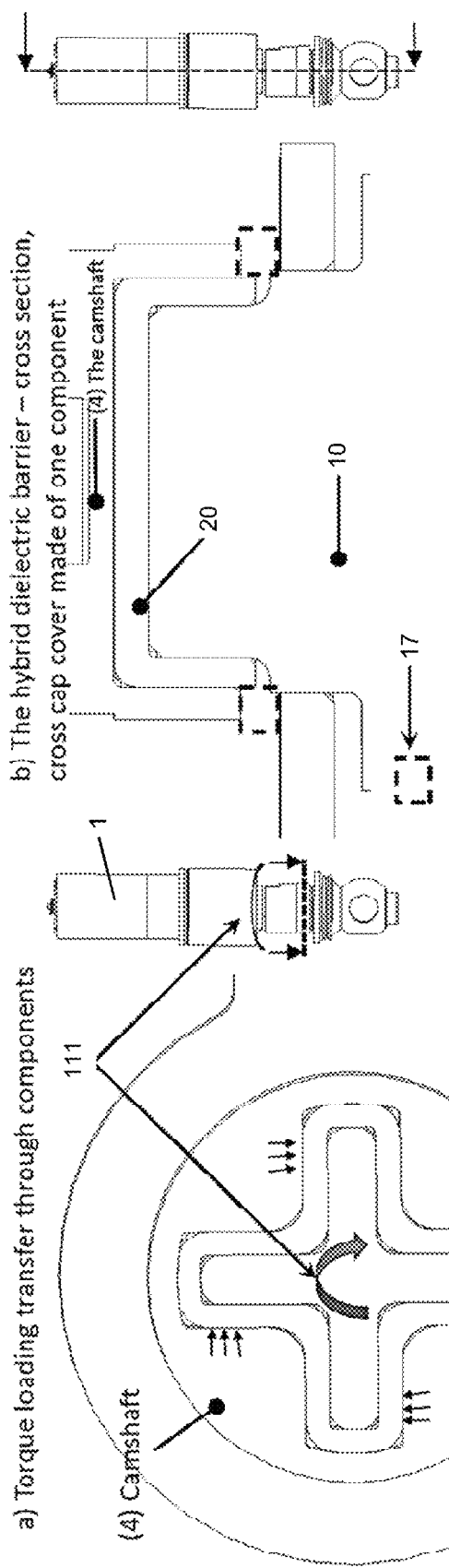
FIG. 6 shows the pressure loading which represents a moment being transferred through the system and acting on the assembly with an insert as shown in FIGS. 4 and 5.
FIG. 7 is a sectional view of an assembly incorporating a dielectric insulator insert such as shown in FIGS. 4 and 5.

As shown in FIG. 6, as the motor 1 rotates the cam shaft 4, the resulting torque 111 from the rotating blind bore 16 engaging with the insert 20, which is held in position on the protrusion 16 of the ball shaft, causes pressure loading 112 on the insert 20 which compresses and the torque is transferred to the ball shaft 10. Engineering plastics such as PEEK, G10 or rubber (EPDM) such as used for the dielectric barrier show superior strength in compression compared to strength in the tension or shear directions.

The dimensions of the protrusion 16, insert 20 and blind bore 15 in the axial direction may be designed, as shown in FIG. 7, such that an air gap 17 is created between the cam shaft and the ball shaft to provide additional dielectric isolation at the perimeters of the shafts.

Figure 3:
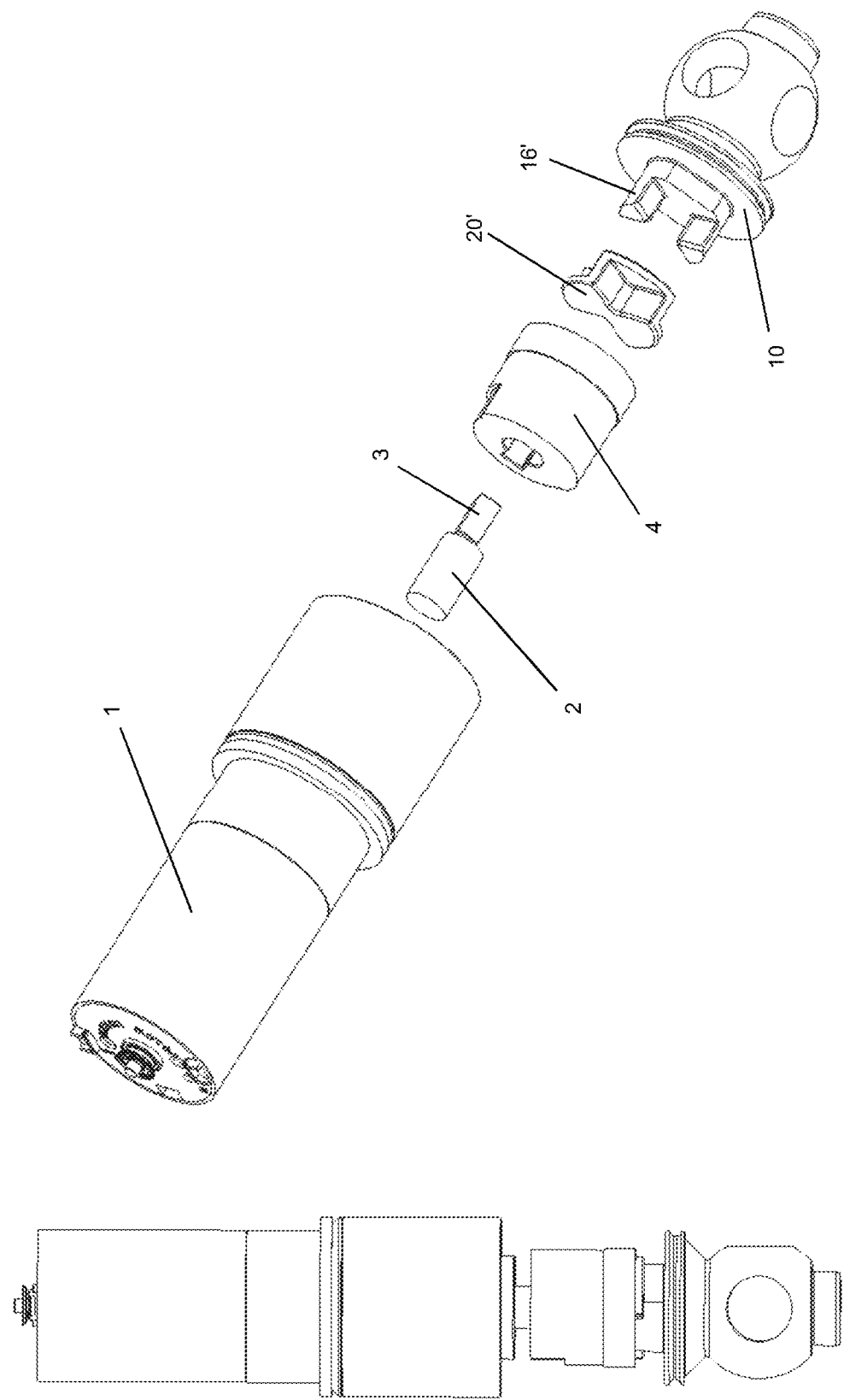
FIG. 3 is an exploded view of the assembly of FIG. 1 according to a second example.
Figure 8:
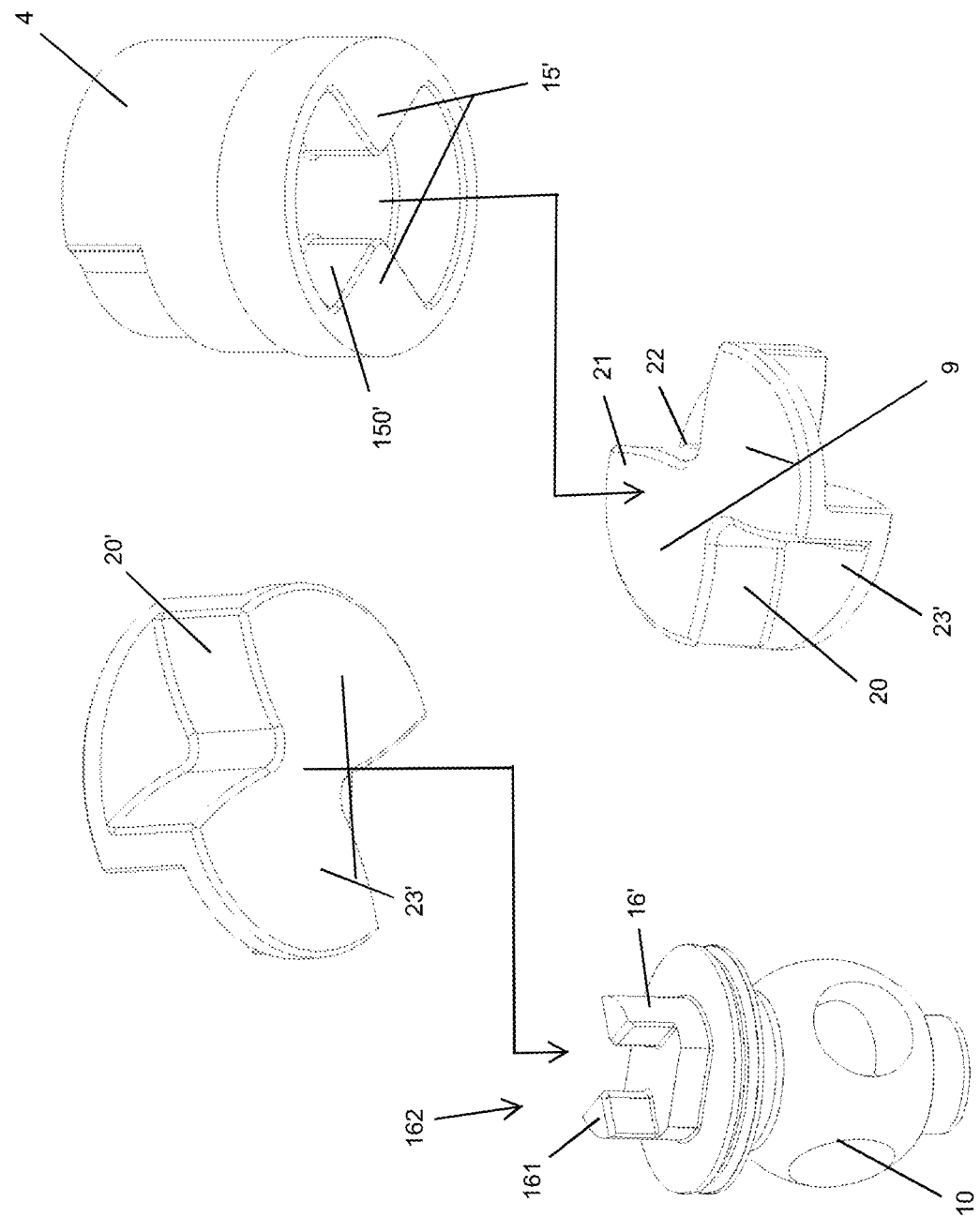
FIG. 8 is a perspective view of another example of cam shaft, ball shaft and dielectric insulator insert for an assembly in accordance with another example of the disclosure.
Figure 9:
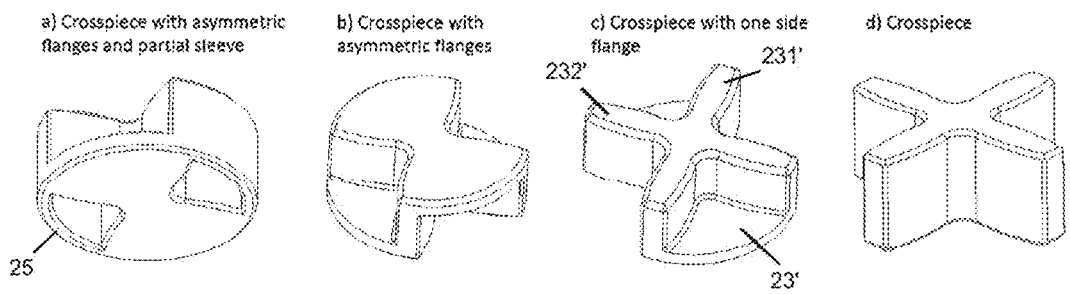
FIGS. 9A to 9D show the insert of FIG. 8 in various examples and from different perspectives.

In another example, described with reference to FIG. 3 and FIGS. 8 to 11, the insert 20' may be formed as a cross-piece defined by two opposing essentially triangular cross-section flanges or wedges separated by similarly shaped recesses—this is in effect similar to the cross-shape described above but with the space between two of the four arms 'filled' as shown in FIGS. 3 and 8. The principle, however, is similar to that described in relation to the first example. The insert 20' is fitted over the ball shaft protrusions 16' such that the cam shaft is then fitted to the ball shaft whereby the protrusions 16' fit into the recesses such that the dielectric insert forms a tightly fitted lining between the protrusions and the recesses and is able to transfer torque and provide a dielectric barrier in essentially the same way as the insert 20 described above.

In more detail, with reference to FIG. 8, in this embodiment, rather than having four distinct arms defining a cross, as in the previously described example, the insert 20' has two opposing hollow arcuate segments 21' separate by two opposing recesses 22' closed by a respective flange 23'. The result is that the insert 20' has a top surface defined by the arcuate segments 21' separated by recesses 22' and a bottom surface defined by the flanges 23' separate by the hollow spaces beneath the arcuate segments.

The blind bore 15' is shaped to have a corresponding shape of opposing arcuate recesses 150'. The ball shaft protrusion 16' comprises two upstanding correspondingly shaped arcuate protrusions 161, 162 shaped to closely fit in the arcuate recesses 22', between the flanges 23' of the insert 20. The top surface of the insert 20' is arranged with the arcuate segments 21' closely fitted into the arcuate recesses 150' of the blind bore 15'.

Variations on the shape of the cross-piece are shown in FIGS. 9A to 9D. FIG. 9B shows the cross-piece just described. In an alternative design, as shown in FIG. 9A, the flanges 23' on the bottom surface of the inert may be joined by a flange 25 extending around the full circumference of the insert. This provides a dielectric barrier without air gaps and allows a much higher insulation resistance. The alternative shown in FIG. 9C essentially splits the arcuate segments into two separate arms 231', 232' but retains the bottom flanges 23' which results in a lighter, simpler insert, although one having less strength and stiffness. The revers arrangement would be to separate the bottom flanges into two separate arms and retain the arcuate segments (not shown). The variation shown in FIG. 9D separates both the bottom flanges 23' and the arcuate segments 21' into two separate arms forming a four-armed cross shape as described above.

In a most preferred embodiment, for all of the designs disclosed above, the contact surfaces of the insert which are configured to engage with the blind bore and the protrusions are not straight but, rather, have a convex or bowed shape. Such a shape maintains the contact area between the parts as explained with reference to FIG. 10. The torque 111' generated by the motor 1 is transferred through the parts by means of pressure loading 112'. Because of the bowed shape of the engagement surfaces of the cross arms 21, 21' the contact points can be controlled. This is in contrast to two flat contacting surfaces. Two flat surfaces are never in perfect surface contact due to e.g. geometrical inaccuracies or imperfections. Here the engagement points are around the centre of the cross arms, thus contact is maintained. Different shapes can be formed to shift the contact point as required.

Figure 11C:
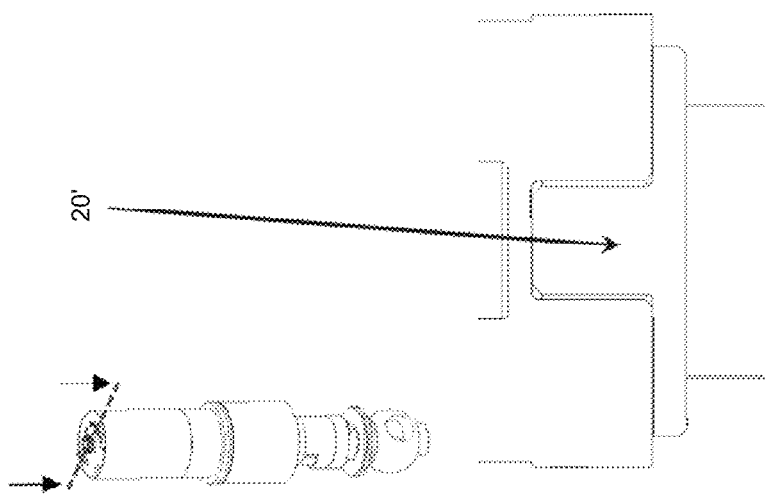
FIGS. 11A to 11C show sectional views of an assembly incorporating a dielectric insulator insert such as shown in FIGS. 8 and 9. From different perspectives
Figure 11B:
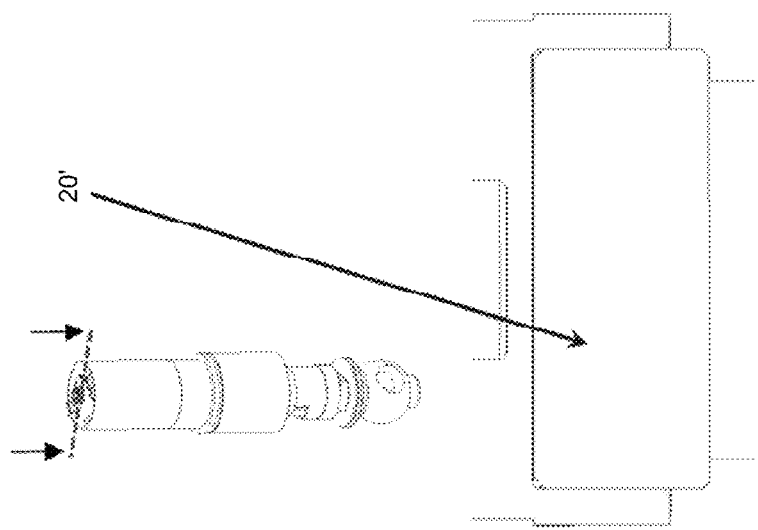
Figure 11A:
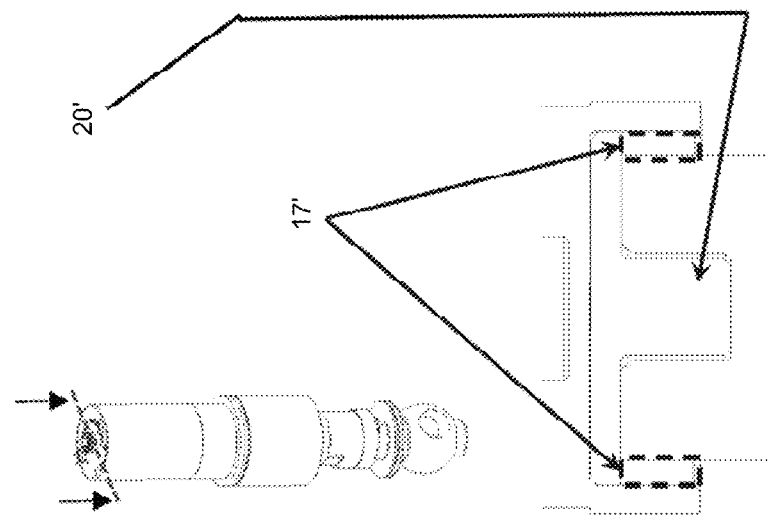

FIGS. 11A to 11C illustrate the effectiveness of the resulting dielectric barrier. In one dimension (FIG. 11A0 being a section through the protrusions 16' of the ball shaft 4, an air gap 17' is created as described for the first example which adds to the dielectric barrier effect. FIG. 11B shows the resulting structure as a section through the arms of the cross piece insert 20'. FIG. 11C is a cross-section through the engaging parts of the blind bore in the cam shaft.

The dielectric insulation assembly provides electrical insulation between the dry and wet parts of the motorised ball valve assembly whilst ensuring torque transfer between the shafts of the respective parts. The insert must therefore have dielectric properties. Various dielectric materials are known and can be used, for example, but not exclusively, plastic, e.g. PEEK, G10, FR4, G11, FR5 etc., rubber (EPDM), ceramic or aluminium with an oxidized layer on the entire outer surface as a dielectric barrier. The material selected should have superior strength in terms of compression rather than in the tension or shear directions, as the torque is transferred in the compression direction as shown in FIGS. 6 and 10. Plastic and rubber materials allow the sleeve to buffer vibration or shocks sent by the motor through the system.

The insert can be quickly and easily fitted and does not require precise alignment, since it will naturally slot into the right shape even if initially located slightly out of alignment. It is therefore impossible to assemble the insert incorrectly. The tight fitting between the parts reduces the effect of any backlash and ensures reliable torque transfer. The shape is also such that coaxiality between the parts is ensured.

The dielectric barrier and compliant joint drive have been described above in the context of a ball shaft valve assembly. This is only an example of where the dielectric barrier can provide advantages and can find application. The dielectric barrier assembly of this disclosure can, however, find application in other assemblies where torque is transmitted between a drive end and a driven end. The scope of the invention is as defined by the claims.

The invention claimed is:

1. A torque transfer assembly comprising:
a drive shaft;
a driven shaft; and
a dielectric insert arranged to be positioned between the drive shaft and the driven shaft, the insert assembly comprising:
a body of dielectric material shaped to form an insulating layer and configured to engage, respectively, with a first shaped engagement feature on the drive shaft and a second shaped engagement feature on the driven shaft, in torque transfer engagement, the insulating layer providing a dielectric barrier between the drive shaft and the driven shaft;
wherein the dielectric insert defines at least two opposing arms separated by recesses, each arm defining two opposing contact surfaces to respectively contact corresponding surfaces of the first or the second engagement feature.

2. The assembly of claim 1, wherein the first or the second engagement feature comprises a blind bore shaped to receive the at least two opposing arms, the blind bore defining surfaces arranged to contact the contact surfaces of the at least two opposing arms, and wherein the other of the first or the second engagement feature comprises protrusion means configured to engage within a hollow space within the at least two opposing arms.

3. The assembly of claim 1, wherein the insert comprises four opposing arms forming a cross shape, and wherein one of the first and second engagement features is a cross-shaped blind bore matching the cross shape of the arms and the other of the first and second engagement features defines a correspondingly cross-shaped protrusions to be received within hollow spaces within the arms.

4. The assembly of claim 1, wherein the insert comprises two opposing arms each formed as an arcuate segment and wherein one of the first and second engagement features is a blind bore defining arcuate recesses matching the shape of the arms and the other of the first and second engagement features defines correspondingly arcuate shaped protrusions to be received within hollow spaces within the arms.

5. The assembly of claim 1, wherein the contact surfaces have a convex or bowed profile.

6. The assembly of claim 1, wherein the insert is formed as a single piece.

7. The assembly of claim 1, wherein the insert is formed of individual segments combined to form the insert.

8. A ball shaft assembly comprising:
a ball shaft; and
an insert assembly as claimed claim 1,
wherein the ball shaft is the driven shaft and the assembly is fitted to the ball shaft.

9. The assembly of claim 8, further comprising a motor arranged to drive the ball shaft via a cam shaft, as the drive shaft.

10. The assembly of claim 9, wherein the motor is an electric motor.

11. The assembly of claim 8 further comprising a handle to manually rotate the ball shaft.

12. An aircraft water supply system including the assembly of claim 8.

* * * * *